(12) United States Patent
Shiraishi et al.

(10) Patent No.: US 7,650,817 B2
(45) Date of Patent: Jan. 26, 2010

(54) BICYCLE CRANK ASSEMBLY

(75) Inventors: Shingo Shiraishi, Sakai (JP); Masahiro Yamanaka, Sakai (JP); Takuji Tatsumi, Sakai (JP)

(73) Assignee: Shimano Inc., Osaka (JP)

( * ) Notice: Subject to any disclaimer, the term of this patent is extended or adjusted under 35 U.S.C. 154(b) by 178 days.

(21) Appl. No.: 11/475,213

(22) Filed: Jun. 27, 2006

(65) Prior Publication Data

US 2007/0062328 A1 Mar. 22, 2007

(30) Foreign Application Priority Data

Sep. 8, 2005 (JP) .............................. 2005-260374

(51) Int. Cl.
*B62M 3/00* (2006.01)
*F16C 9/00* (2006.01)
*F16C 13/00* (2006.01)

(52) U.S. Cl. ...................... 74/594.1; 280/259; 384/458; 384/545

(58) Field of Classification Search ................ 74/594.1, 74/594.2; 384/545, 458; 280/259
See application file for complete search history.

(56) References Cited

U.S. PATENT DOCUMENTS

| 627,597 | A | | 6/1899 | Scott | |
|---|---|---|---|---|---|
| 846,239 | A | * | 3/1907 | Osborne | ..................... 74/594.2 |
| 4,044,621 | A | | 8/1977 | McGregor, Sr. et al. | |
| 4,252,384 | A | | 2/1981 | Duvoisin et al. | |
| 4,704,919 | A | | 11/1987 | Durham | |
| 5,819,600 | A | * | 10/1998 | Yamanaka | ................. 74/594.1 |
| 5,997,104 | A | * | 12/1999 | Campagnolo | ............ 301/110.5 |
| 6,014,913 | A | * | 1/2000 | Masahiro | .................... 74/594.1 |
| 6,415,684 | B1 | | 7/2002 | Yamanaka | |
| 7,267,030 | B2 | * | 9/2007 | French | ...................... 74/594.1 |
| 7,503,700 | B2 | * | 3/2009 | Yamanaka et al. | ........... 384/545 |
| 2006/0101941 | A1 | * | 5/2006 | Yamanaka | ................. 74/594.1 |
| 2007/0241530 | A1 | * | 10/2007 | Nonoshita et al. | ........... 280/259 |
| 2008/0247695 | A1 | * | 10/2008 | Yamanaka | ................... 384/458 |

FOREIGN PATENT DOCUMENTS

| DE | 103 891 C | 5/1898 |
|---|---|---|
| EP | 0 485 954 A1 | 5/1992 |
| EP | 1 449 760 A | 8/2004 |
| JP | 2004-249770 | 9/2004 |

OTHER PUBLICATIONS

PTO 09/0969 English Translation of DE 103891, Georges Menard, publication date May 27, 1898.*

* cited by examiner

*Primary Examiner*—Vinh T. Luong
(74) *Attorney, Agent, or Firm*—Global IP Counselors, LLP

(57) ABSTRACT

A bicycle crank assembly is configured to simplify the work required to adjust the bearing play by the crank assembly when the crank assembly is mounted. The bicycle crank assembly has a left crank that is mounted on a crank axle of the bicycle, and is provided with a crank body and an adjustment member. The crank body includes a crank axle mounting part non-rotatably mounting to one end of the crank axle, an arm part extending from the crank axle mounting part, a pedal mounting part for mounting the pedal and provided at the tip of the arm part, and a male screw part formed on the crank axle mounting part. The adjustment member includes a tubular part having a female screw part into which the male screw part is screwed, and a contact part formed at one end of the tubular part and capable of contacting the bearing supporting the crank axle.

20 Claims, 7 Drawing Sheets

BICYCLE CRANK ASSEMBLY

CROSS-REFERENCE TO RELATED APPLICATIONS

This application claims priority under 35 U.S.C. § 119 to Japanese Patent Application No. 2005-260374, filed Sep. 8, 2005. The entire disclosure of Japanese Patent Application No. 2005-260374 is hereby incorporated herein by reference.

BACKGROUND OF THE INVENTION

1. Field of the Invention

This invention generally relates to a bicycle crank assembly. More specifically, the present invention relates to a bicycle crank assembly mounted on a bicycle crank axle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle crank assembly.

The crank assembly is mounted on the crank axle of a bicycle. A conventional crank assembly has a crank axle mounting part non-rotatably mount on an end of the crank axle, a crank body extending from the crank axle mounting part in an outward in a radial direction, and a pedal mount provided at the tip of the crank body. In this type of crank assembly, a right side gear crank is conventionally known to be crimp-fastened to the crank axle (see, for example, Japanese Laid-Open Patent Publication No. 2004-249770).

A conventional left side crank assembly has a slit formed in the crank axle mounting part, and two clamping bolts are provided to narrow the slit with the crank axle with the slit gap prevented from turning by serrations on the left end of the crank axle. Furthermore, the left side crank assembly is fixed to the crank axle by a fixed bolt that screws into the left inner circumferential surface of the crank axle.

A bearing play adjustment function, such as bearing pressing, is not provided for the bearings of conventional crank axles. Therefore, adjustment of bearing play, that is, adjustment so that the crank axle rotates smoothly without bearing jounce in the axial direction, is accomplished by adjusting the degree of tightness when fixing the left side crank assembly with the fixed bolt. Then, when the bearing play adjustment is completed, the clamping bolt is tightened to narrow the slit and fix the crank assembly to the crank axle. Accordingly, since bearing adjustment is accomplished by the fixed bolt to fix the crank assembly in a conventional crank assembly, the play adjustment by the fixed bolt must be performed again when the crank assembly is removed from the crank axle and the crank assembly is mounted on the crank axle.

Conventionally, a crank assembly is fixed to the crank axle using a taper. When a taper is used for mounting and the fixed bolt that screws into the crank axle is not completely tightened, a gap is created between the crank assembly and the crank axle, such that the crank assembly can not be rigidly fixed to the crank axle. Therefore, a fixed bolt can not be used when adjusting the crank assembly for bearing play. When adjusting the crank assembly for bearing play in structures in which both components are coupled using a taper, it is necessary to adjust bearing play by inserting a shim into the gap between the bearing and the crank assembly.

However, when the bearing play is adjusted by the crank assembly and a taper is used to couple the crank assembly and the crank axle, however, bearing play must be adjusted each time the crank assembly is mounted. This adjustment is necessary because the position of the crank assembly in the axial direction is subject to shifting each time the assembly is removed due to the finish precision of the crank axle taper and the crank assembly taper. Thus, when the crank assembly shifts position in the axial direction, the bearing play must be adjusted to change the gap between the bearing and the crank assembly. In this case, the work of bearing adjustment becomes complicated since removing the fixed bolt and crank assembly must be repeated to add and subtract the shims when changing gap using shims during bearing play adjustment.

In view of the above, it will be apparent to those skilled in the art from this disclosure that there exists a need for an improved bicycle crank assembly. This invention addresses this need in the art as well as other needs, which will become apparent to those skilled in the art from this disclosure.

SUMMARY OF THE INVENTION

One object of the present invention is to provide a bicycle crank assembly that simplifies the work of adjusting bearing play by the crank assembly when the crank assembly is mounted.

In accordance with a first aspect of the present invention, the foregoing object can basically be attained by providing a bicycle crank assembly that includes a crank body and an adjustment member. The crank body has a crank axle mounting part, an arm part, a pedal fitting part and a first screw part. The crank axle mounting part is configured and arranged to be non-rotatably installed on one end of a crank axle. The arm part extends from the crank axle mounting part. The pedal fitting part is provided on a radial outer end of the arm part. The first screw part is formed on the crank axle mounting part. The adjustment member has a tube-shaped fixing part and a contact part. The tube-shaped fixing part has a second screw part threadedly engaged with the first screw part to selectively position the adjustment member relative to the crank axle mounting part. The contact part is formed on one end of the tube-shaped fixing part. The contact part is configured to contact a bearing supporting the crank axle.

When this crank assembly is mounted on the crank axle, the second screw part of the adjustment member is screwed into the first screw part of the crank assembly beforehand, and the adjustment member is screwed into the crank axle mounting part. In this state, the crank axle mounting part is mounted on the crank axle, and the crank assembly is fixed to the crank axle by a suitable fixing means, such as a fixed bolt or the like. When the crank assembly is fixed, the adjustment member is turned toward the bearing in a direction loosening the threads, such that the degree of contact is adjusted to have the adjustment member contact the bearing. Thus, bearing play adjustment is accomplished. In this case, an adjustment member is provided that screws into the crank axle mounting part and the crank assembly, and the work of adjusting bearing play by the crank assembly is accomplished simply since the bearing play adjustment is performed by turning the adjustment member.

The bicycle crank assembly in accordance with a second aspect of the present invention provides the bicycle crank assembly of the first aspect of the present invention with the first screw part being a male screw part and the second screw part being a female screw part. In this case, the adjustment member can be easily rotated relative to the crank body.

The bicycle crank assembly in accordance with a third aspect of the present invention provides the bicycle crank assembly of the second aspect of the present invention with the adjustment member having a slit extending through the tube-shaped fixing part and the contact part so that the tube-shaped fixing part and the contact part have an overall configuration of a split ring with a clamping bolt spanning the slit for selectively narrowing the slit. In this case, the adjustment member reliably locks after the bearing play adjustment is completed by narrowing the slit via the clamping bolt. Therefore, when the crank assembly is once mounted on the crank axle, the bearing play is unlikely to change until remounting.

The bicycle crank assembly in accordance with a fourth aspect of the present invention provides the bicycle crank assembly of anyone of the first through third aspects of the present invention with the tube-shaped fixing part having a pair of projections formed to project from an outer circumferential surface of the tube-shaped fixing part with the clamping bolt being threaded into a screw hole formed in one of the projections and a through-hole being formed in the other one of the projections. In this case, the screw hole and through-hole are easily arranged to narrow the slit, the limit on the size of the screw hole and through-hole is relaxed, and the adjustment member can be reliably locked to the crank axle mounting part. Furthermore, the adjustment member is easily turned by hand using the projections.

The bicycle crank assembly in accordance with a fifth aspect of the present invention provides the bicycle crank assembly of anyone of the first through fourth aspects of the present invention with the crank axle mounting part having a crank axle receiving hole that is configured to non-rotatably engage the crank axle. The crank axle receiving hole has a tapered surface that slopes radially inward as the tapered surface extends away from the adjustment member. In this case, the bearing play adjustment that must be performed each time the crank assembly is mounted on the crank axle is readily accomplished using the taper.

The bicycle crank assembly in accordance with a sixth aspect of the present invention provides the bicycle crank assembly of the fifth aspect of the present invention with the crank axle receiving hole including a plurality of axially extending recesses formed along at least a portion of the tapered surface to define splines configured to non-rotatably engage the crank axle. In this case, since the coupling is accomplished by both tapered surface and spline coupling, jouncing of the crank assembly is unlikely to occur.

The bicycle crank assembly in accordance with a seventh aspect of the present invention provides the bicycle crank assembly of anyone of the first through sixth aspects of the present invention with the contact part being configured and arranged to project axially relative to the tube-shaped fixing part to press an inner ring of a bearing inwardly in an axial direction. In this case, adjustment of the bearing play can be accomplished by pressing the inner ring side of the bearing.

The bicycle crank assembly in accordance with an eighth aspect of the present invention provides the bicycle crank assembly of the sixth aspect of the present invention with the adjustment member having a rotation operation part formed on the outer circumferential surface of the tube-shaped fixing part with the rotation operation part being configured and arranged to assist in rotating the adjustment member. In this case, the adjustment member can be easily turned by hand when adjusting the bearing play by turning the adjustment member because the outer circumferential surface of the rotation operation is provided with a projection and concavity.

The bicycle crank assembly in accordance with a ninth aspect of the present invention provides the bicycle crank assembly of anyone of the first through eighth aspects of the present invention with the adjustment member including a seal member mounted on an inner circumferential surface of the contact part and arranged to seal a gap between the crank axle and the contact part. In this case, foreign matter does not easily penetrate from the contact part to the crank assembly side since the seal member is installed at the inner circumferential surface of the contact part.

According to the present invention, an adjustment member is provided that screws into the crank axle mounting part and the crank assembly, and the work of adjusting bearing play by the crank assembly is accomplished simply since the bearing play adjustment is performed by turning the adjustment member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
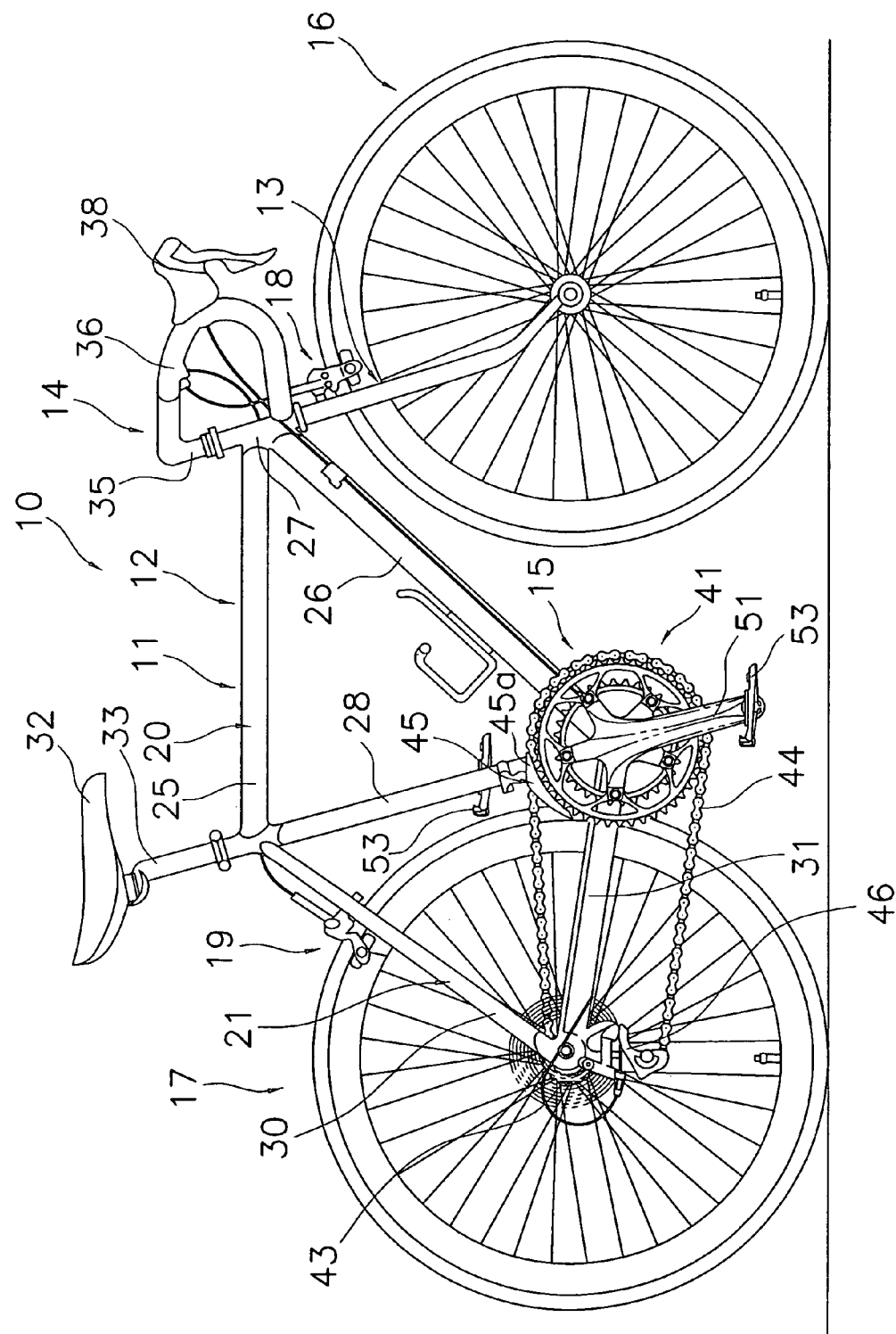
FIG. 1 is a right side elevational view of a bicycle with a bicycle crank axle assembly in accordance with one embodiment of the present invention.

Referring initially to FIG. 1, a bicycle 10 is illustrated in accordance with a first embodiment of the present invention. As seen in FIG. 1, the bicycle 101 is a "road racer" (racing style road bike) that has a diamond-shaped frame 11 that serves as the framework of the bicycle. The frame 11 has a frame body 12 and a front fork 13 attached thereto. The bicycle 10 also has a drop-type handlebar unit 14 attached to the front fork 13. The front fork 13 is supported on a front part of the frame 12 such that it can rotate freely about an axis that is tilted slightly from vertical. The lower part of the front fork 13 is divided into two prongs. The bicycle 10 also has a drive unit or drive train 15, a front wheel 16, a rear wheel 17 and front and rear brake devices 18 and 19. The drive train 15 is configured to convert the rider's pedaling force into driving force. The front wheel 16 is supported in a freely rotatable manner on the bottom end of the front fork 13. The rear wheel 17 is supported in a freely rotatable manner on a rear part of the frame body 12. The bicycle 10 is also provided with a pair (front and rear) of brake devices 18 and 19.

As seen in FIG. 1, the frame body 12 has a triangularly shaped main or front triangle 20 and a triangularly shaped rear triangle 21 that is arranged rearward of the front triangle 20. The front triangle 20 is formed by a top tube 25, a down tube 26, head tube 27 and a seat tube 28. The top tube 25 is arranged generally horizontally, while the down tube 26 is arranged below the top tube 25 such that it slants obliquely upward toward the front. The head tube 27 joins the front ends of the top tube 25 and the down tube 26 together. The seat tube 28 extends diagonally upward and joins the rear ends of the top tube 25 and the down tube 26 together. A seat post 33 has a saddle or seat 32 fastened thereto. The seat post 33 is secured in the seat tube 28 such that its position can be vertically adjusted up and down. A cylindrical or tubular hanger 29 (shown in FIG. 2) is formed at a connection portion where the seat tube 28 and the down tube 26 are joined together. The rear triangle 21 is formed by the seat tube 28, a pair of seat stays 30 and a pair of chain stays 31. The seat stays 30 are joined at their front ends to the seat tube 28 and extend diagonally downward as two separate prongs. The chain stays 31 also extend rearward as two separate prongs, but from the bottom end of the seat tube 28. The chain stays 31 are joined at their rear ends to the seat stays 30.

The handlebar unit 14 includes a handlebar stem 35 and a handlebar 36. The handlebar stem 35 of the handlebar unit 14 is fastened to the upper part of the front fork 13 in such a manner that it can be vertically moved up and down. The handlebar 36 is fixed at a horizontally extending center portion on a top edge of the handle stem 35 with both free ends having curved portions extending from the center portion. A brake lever 38 provided with a gear shifting capability is mounted on both ends of the handlebar 36.

The drive unit 15 basically includes a front crankset 41, a rear gear cassette unit 43, a chain 44, a front derailleur 45, and a rear derailleur 46. The front crankset 41 is provided on the hanger 29 of the bicycle 10. The rear gear cassette unit 43 is mounted in a non-rotatable manner to the free hub of the rear wheel 17. The chain 44 is arranged on the front crankset 41 and the rear gear cassette unit 43 so as to span therebetween. The front derailleur 45 and the rear derailleur 46 function as gear changing devices. The front derailleur 45 has a chain guide 45a where the chain 44 is inserted.

Figure 2:
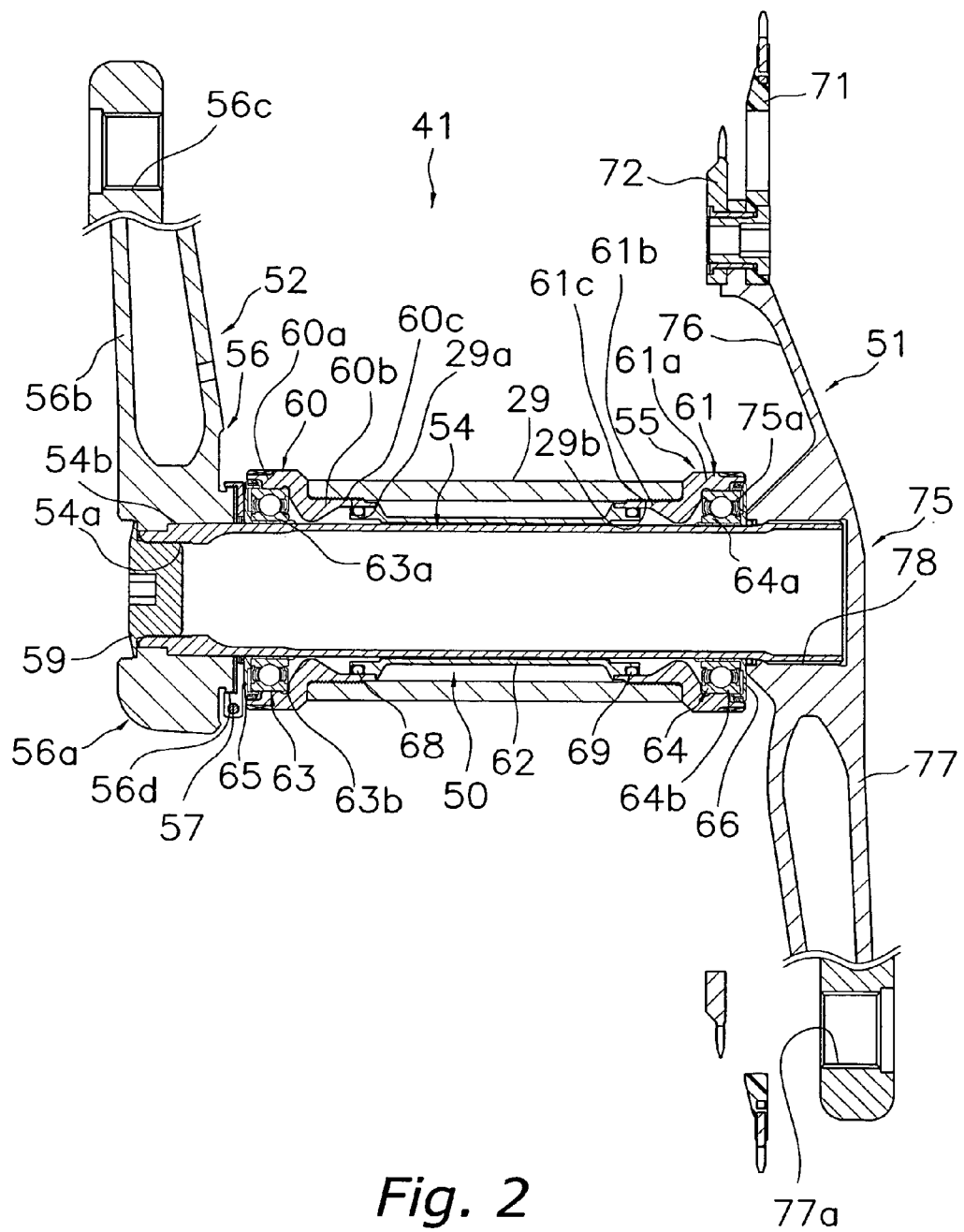
FIG. 2 is a transverse cross sectional view of the bicycle crank axle assembly in accordance with the illustrated embodiment of the present invention.

As shown in FIGS. 1 and 2, the front crankset 41 basically includes a crank axle assembly 50, a right crank 51, a left crank 52, and a pair of pedals 53 (FIG. 1). The crank axle assembly 50 preferably has a crank axle 54 rotatably supported on the hanger 29 of the frame 11 by a bottom bracket 55 (e.g., a crank axle bearing assembly of this invention) that is fixedly mounted on the hanger 29. The right and left cranks 51 and 52 are removably fastened to the right and left ends of the crank axle 54 with the pedals 53 mounted to the tip or free ends of the right and left cranks 51 and 52. The crank axle assembly 50 is securely retained in the hanger part 29 of the frame 11 by a fixed member 56 as discussed below.

Figure 3:
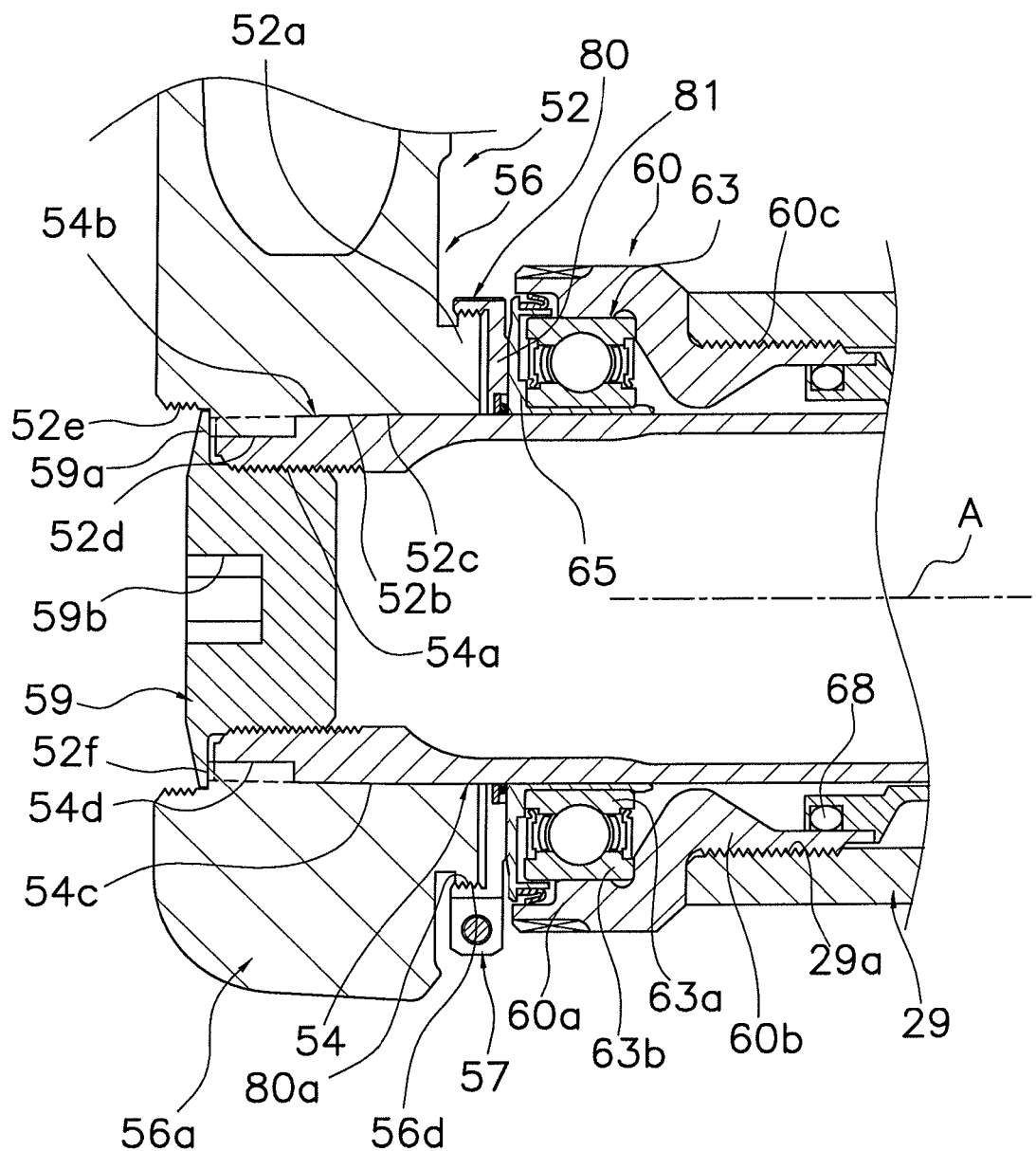
FIG. 3 is an enlarged partial cross sectional view of a left side portion of the bicycle crank axle assembly in accordance with the illustrated embodiment of the present invention.

The crank axle 54 is preferably an alloy hollow pipe-shaped member that is highly rigid such as chrome molybdenum steel. In addition, as shown in FIG. 3, the left end portion of the crank axle 54 includes a female (internal threads) screw part 54a and an end fixing part 54b with a plurality of external serrations. The female (internal threads) screw part 54a is disposed on an inner circumferential surface of the left end portion of the crank axle 54 so that a fixed bolt 59 is screwed into the female screw part 54a to fasten the left crank 52. The fixed bolt 59 has a tool anchor hole 59b used for tightening, such as an Allen wrench or the like, in the center of the outer circumferential surface. The serrations are provided on the outer circumferential surface of the end fixing part 54b to engage serrations formed in the inner end portion of the left crank 52 to non-rotatably link the left crank 52 to the crank axle 54.

The end fixing part 54b has a first taper surface 54c that narrows, and a first spline 54d that recesses inward in a radial direction on at least part of the first taper surface 54c, specifically, the tip outer circumferential surface, and non-rotatably couples with the crank axle mounting part. The first taper surface 54c is a taper surface having, for example, an inclination angle of approximately 0.5 to 1.5 degrees.

As shown in FIG. 2, the bottom bracket 55 includes a pair (right and left) of bearing housings (e.g., the first and second axle supporting members) 60 and 61, a tube-shaped connecting member 62, a pair (right and left) of axle bearings 63 and 64, and a pair (right and left) of cover members 65 and 66. The axle bearing housings 60 and 61 are screwed in from both ends of the hangar part 29. The tube-shaped connecting member 62 concentrically links the right and left axle bearing housings 60 and 61. The right and left axle bearings 63 and 64 are mounted on the right and left axle bearing housings 60 and 61. The right and left cover members 65 and 66 are mounted between the crank axle 54 and inner rings of right and left axle bearings 63 and 64. In this embodiment, the left axle bearing 64 constitutes a first bearing and the right axle bearing 63 constitutes a second axle bearing.

The right and left axle bearing housings 60 and 61 are stepped tubular members that include a pair (right and left) of bearing retaining sections 60a and 61a, respectively, and a pair (right and left) of mounting sections 60b and 61b, respectively. The axle bearings 63 and 64 are retained and stored separately in the bearing retaining sections 60a and 61a. The right and left mounting sections 60b and 61b are placed in alignment with the bearing retaining sections 60a and 61a, respectively, and non-rotatably mounted on the axial end portions of the hanger 29. The bearing retaining sections 60a and 61a are disposed axially outwardly with respect to the mounting sections 60b and 61b and have a larger maximum diameter than the mounting sections 60b and 61b as seen in FIG. 2. The hanger 29 includes the female screw parts 29a and 29b on the inner circumference on its both right and left edges, and the mounting sections 60b and 61b include male screw parts 60c and 61c that are placed axially inwardly with respect to the bearing retaining sections 60a and 61a so that the male screw parts 60c and 61c of the mounting sections 60b and 61b are screwed with the female screw parts 29a and 29b, respectively. In order to prevent the screws from becoming loose by rotation of the cranks, the left female screw part 29a is preferably right-hand screw threads, and the right female screw part 29b is preferably left-hand screw threads. Therefore, the male screw part 60c that screws into the left female screw part 29a is preferably right-hand screw threads, and the male screw part 61c is preferably left-hand screw threads.

The connecting part 62 is a tubular member that has an inside diameter that allows passage of the crank axle 54 therethrough. The connecting part 62 is coupled to inner edges of the mounting sections 60b and 61b of the right and left axle bearing housings 60 and 61 at axial ends thereof. Two O rings 68 and 69 are preferably mounted on connecting parts of the connecting member 62 and the axle bearing housings 60 and 61, respectively as seen in FIG. 2.

The axle bearings 63 and 64 are preferably ball bearings or roller bearings that include inner rings 63a and 64a and outer rings 63b and 64b with a plurality of ball bearing disposed therebetween. The axle bearings 63 and 64 are disposed so that movements of the inner rings 63a and 64a toward outside in the axial direction (the axle bearing 63 is on the left in FIG. 2, and the axle bearing 64 is on the right in FIG. 2) is restricted by the right and left crank arms 51 and 52 via the cover members 66 and 65 respectively, and movements of the outer rings 63b and 64b toward the inside in the axial direction (the axle bearing 63 is on the left in FIG. 2, and the axle bearing 64 is on the right in FIG. 2) is restricted by the axle bearing housings 60 and 61, respectively. The axle bearings 63 and 64 are preferably sealed bearings where seals are mounted between the inner rings 63a and 64a and the outer rings 63b and 64b, respectively, and grease is inserted in the axle bearings 63 and 64 in advance. Therefore, maintenance of the axle bearings 63 and 64 for lubrication can be omitted. Accordingly, with the arrangement of the crank axle assembly 50 as described above, the axis diameter of the crank axle 54 can be lengthened by placing the axle bearings 63 and 64 on the outside of the hanger part 29 in the axial direction. Therefore, the weight of the crank axle assembly 50 can be reduced by making the crank axle 54 hollow while the strength and rigidity of the crank axle 54 can be maintained at a high level.

The cover members 65 and 66 are, for example, hard resin members that cover the circumference end surfaces on the axle bearing housings 60 and 61. The cover members 65 and 66 are disposed so that the cover members 65 and 66 are sandwiched by the left and right cranks 52 and 51 and the inner rings 63a and 64a of the axle bearings 63 and 64, respectively.

As seen in FIG. 2, the right crank 51 is a gear crank that has a pair of chain rings or sprockets 71 and 72 mounted thereon in a removable manner. The right crank arm 51 includes a crank connecting part 75, a plurality of arm parts 76, and a right crank arm part 77. The crank connecting part 75 has a mounting recessed part 78 that is formed with a tube-shaped space and non-rotatably mounted on the right edge of the crank axle 54. The arm parts 76 (five arm parts 76 are provided in this embodiment) can mount the sprockets 71 and 72 on their free ends and radially extend from the crank connecting part 75. The right crank arm part 77 is fixedly coupled on the right edge of the crank axle 54 and a pedal mounting hole 77a is formed on its free end. An inner edge surface 75a in the axial direction of the connecting part 75 of the right crank arm 51 is disposed to press the inner ring 64a of the axle bearing 64 via the cover member 66.

The left crank 52 has a hollow left crank body 56, and an adjustment member 57 mounted on the crank body 56, as shown in FIG. 2. The crank body 56 basically includes a crank axle mounting part 56a, an arm part 56b, a pedal mounting part 56c and a male screw part 56d. The crank axle mounting part 56a is non-rotatably mounting to one end of the crank axle 54. The arm part 56b extends radially outward from the crank axle mounting part 56a. The pedal mounting part 56c is provided at the tip of the arm part 56b for mounting the pedal 53. The male screw part 56d is formed on the crank axle mounting part 56a and constitutes an example of the first screw part.

As shown in FIG. 3, a projection 52a is formed on the surface of the crank axle mounting part 56a opposite the bearing 63 and extending toward the cover member 65. A male screw part 56d is formed on the outer circumferential surface of the projection 52a. A taper hole 52b having a center axis A is formed on the inner circumferential surface of the crank axle mounting part 56a for engaging the end fixing part 54b of the crank axle 54. The taper hole 52b has a second taper surface 52c that connects to the first taper surface 54c, and a second spline formed on at least part of the second taper surface 52c. Specifically, the inner circumferential surface on the tip edge and projecting inward in a radial direction and that non-rotatably connects to the first spline 54d. The second taper surface 52c has an angle of inclination of, for example, approximately 0.5 degrees to approximately 1.5 degrees. Furthermore, a female screw part 52e is formed on the inner circumferential surface of the tip edge of the crank axle mounting part 56a to allow an extraction tool to be screwed therein when removing the left crank 52, and an abutting surface 52f is formed between the female screw part 52e and the tip edge surface of the second spline 52d to abut the head part 59a of the fixed bolt 59. The second spline 52d is formed so as to non-rotatably couple to the crank axle 54 at a predetermined rotation phase when connected to the first spline 54d.

The adjustment member 57 has a tube-shaped fixing part 80 and a contact part 81. The tube-shaped fixing part 80 includes a female screw part (example of the second screw part) that accepts the male screw part 56d. The contact part 81 is configured and arranged to contact the bearing 63 that supports the crank axle 54 at one end of the tube-shaped fixing part 80. Furthermore, the adjustment member 57 includes a slit 82, a clamping bolt 83, a screw hole 84 and a through-hole 85. The slit 82 is formed from the outer circumferential surface of the tube-shaped fixing part 80 to inner circumferential surface of the contact part 81. The clamping bolt 83 is configured and arranged to narrow the slit 82. The screw hole 84 is formed at one end and threadedly receives the clamping bolt 83 to adjust the size of the slit 82. The through-hole 85 is formed at the other end and freely receives the clamping bolt 83 therethrough. The clamping bolt 83 is preferably a hexagonal socket head bolt that is inserted toward the screw hole 84 from the through-hole 85 side, such that the adjustment member 57 is fixed to the projection part 52a of the crank axle mounting part 56a and prevents rotation by narrowing the width of the slit 82 when the clamping bolt 83 is tightened.

The tube-shaped fixing part 80 has a pair of first projections (example of the rotation operation part) 80b and 80c projecting outward in a radial direction with the slit 82 formed therebetween. The screw hole 84 is formed in the first projection 80c, while the through-hole 85 is formed in the first projection 80b. The tube-shaped fixing part 80 further includes a second projection (example of the rotation operation part) 80d on the outer circumferential surface on the opposite side relative to the first projections 80b and 80c. Several concavo-convexities (example of the rotation operation part) 80e are formed by, for example, a knurling process on the remaining outer circumferential surface of the tube-shaped fixing part. The first projections 80b and 80c and the second projection 80d, and the concavo-convexities 80e are provided for facilitating manually turning the adjustment member when adjusting the bearing play with the left crank 52 mounted to the crank axle 54.

The contact part 81 has a generally washer shape, with the contact surface 81a projecting toward the cover member 65 at an intermediate part in the radial direction. The contact surface 81a makes contact with the cover member 65, which is in contact with the inner ring 63a of the bearing 63. Thus, the adjustment member 57 presses the inner ring 63a inward in the axial direction (to the right in FIG. 3) via the contact part 81 and the cover member 65. A recessed seal member mounting part 81b is formed on the inner circumferential surface of the contact part 81 so as to open toward the cover member 65 side. A seal member 86 is mounted on the seal member mounting part 81b to seal the gap between the crank axle 54 and the contact part 81. The seal member 86 is disposed at the inside of the seal member mounting part 81b, and preferably has a metal back-up ring 86a, and a flexible synthetic resin body seal ring 86b fixed to the back-up ring 86a by a suitable fixing means, such as, for example, adhesive or the like. Foreign matter and the like are unlikely to penetrate from the contact part 81 to the crank assembly body 50 side when such a seal member is mounted inside the adjustment member 57.

The bearings 63 and 64 and the cover members 65 and 66 are first installed beforehand on the left and right bearing housings 60 and 61 when the left crank 52 of the above configuration is mounted on the hanger 29. Further, the connecting member 62 is mounted beforehand on one or another of the bearing housings 60 and 61. In this state, bearing housings 60 and 61 are screwed into the female screw parts 29a and 29b of the cover part 29 with a torque on a predetermined range. Next, the right crank 51 to which the crank axle 54 is fixedly coupled is inserted from the side of the axle bearing housing 61. Then, the adjustment member 57 is screwed on to the inside of the projection part 52a of the left crank 52. At this time the clamping bolt 83 has been loosened beforehand, and the adjustment member 57 is in a rotatable state. After the adjustment member 57 has been screwed on, the left crank 52 is mounted with a rotational phase varying by 180 degrees from the right crank 51, and fixed in position with the fixed bolt 59. A special concavo-convexity (not shown), for example, a single concavo-convexity, with a circumferential length greater than the other parts is formed on the first and second splines 54d and 52d so as to dispose the right crank 51 and the left crank 52 at a rotational phase of 180 degrees. Therefore, both of the cranks 51 and 52 can be disposed at a rotational phase of 180 degrees by engaging the special concavo-convexity.

Figure 4:
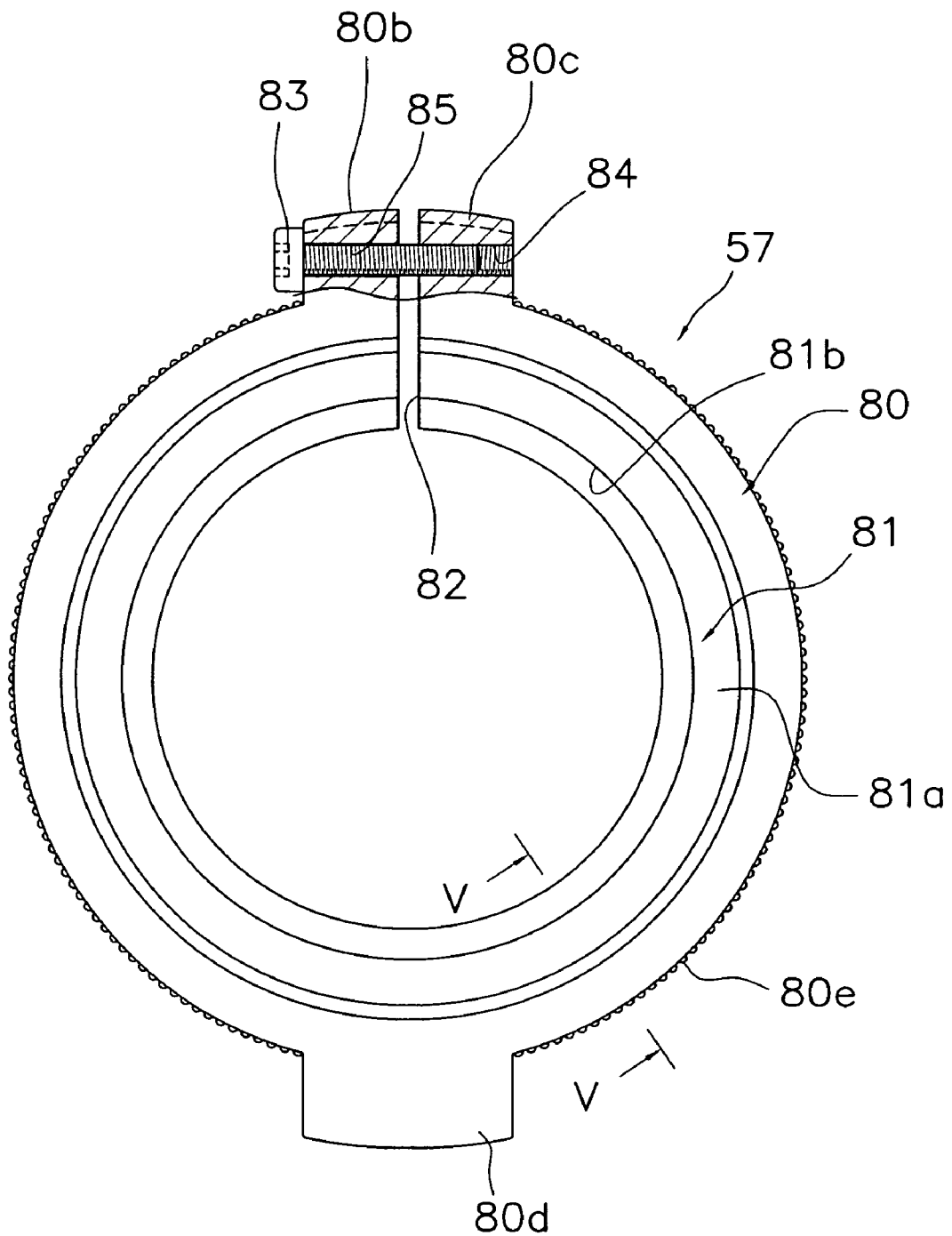
FIG. 4 is a front elevational view of the adjustment member in accordance with the illustrated embodiment of the present invention.
Figure 5:
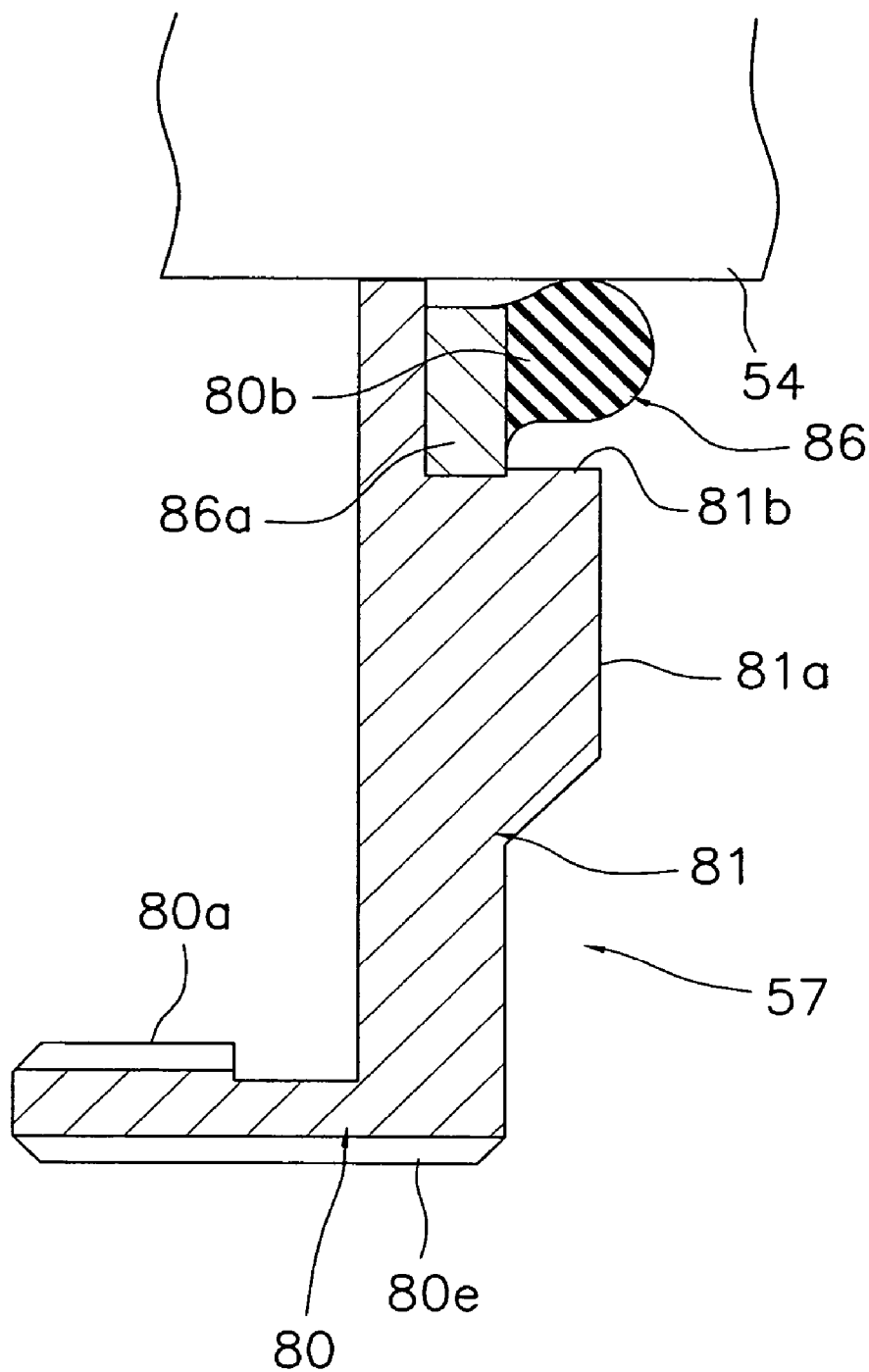
FIG. 5 is an enlarged partial cross sectional view of the adjustment member as seen along section line V-V line of FIG. 4.

In this state, the adjustment member 57 is turned in the thread loosening direction (for example, counterclockwise in FIG. 4). Then, the bearing play is adjusted by the contact part 81 of the adjustment member 57 pressing against the inner ring 63a of the bearing 63 through the cover member 65. When bearing play adjustment is completed, the clamping bolt 83 is tightened to narrow the width of the slit 82 and fix the adjustment member 57 to the projection 52a. In this way, the adjustment member 57 is prevented from turning, and the once adjusted bearing play is unlikely to change until the next time the left crank 52 is removed.

In this case, the work of adjusting bearing play is easily performed by the left crank 52 by providing an adjustment member 57 that screws into the crank axle mounting part 56a on the left crank 52, and adjusting bearing play by rotating the adjustment member 57.

Although the first screw part is a male screw part 56d, and the second screw part is a female screw part 80a in the above embodiment, the reverse disposition is also possible as described in the second illustrated embodiment.

Second Embodiment

Figure 6:
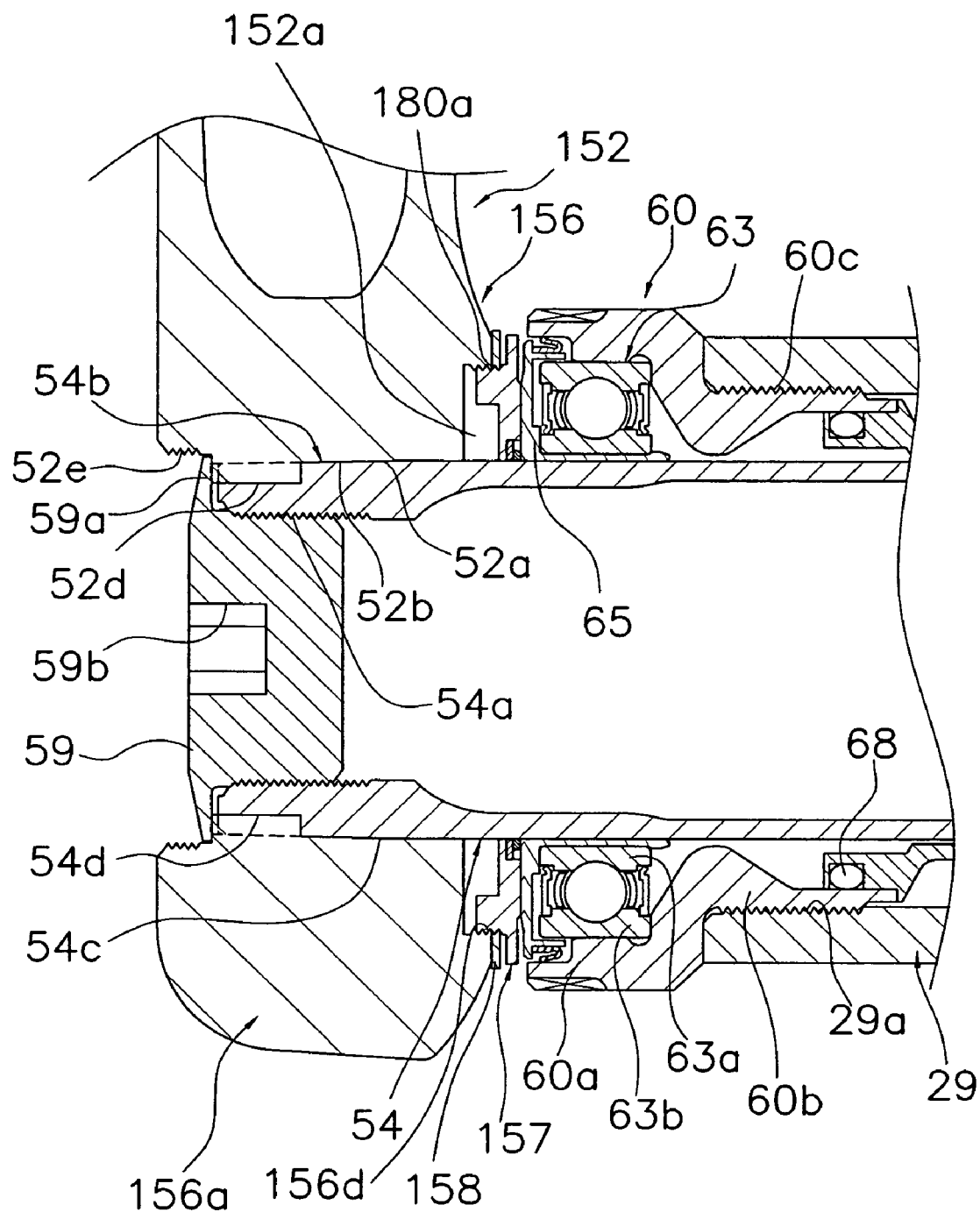
FIG. 6 is an enlarged partial cross sectional view of a left side portion of the bicycle crank axle assembly in accordance with another embodiment of the present invention.
Figure 7:
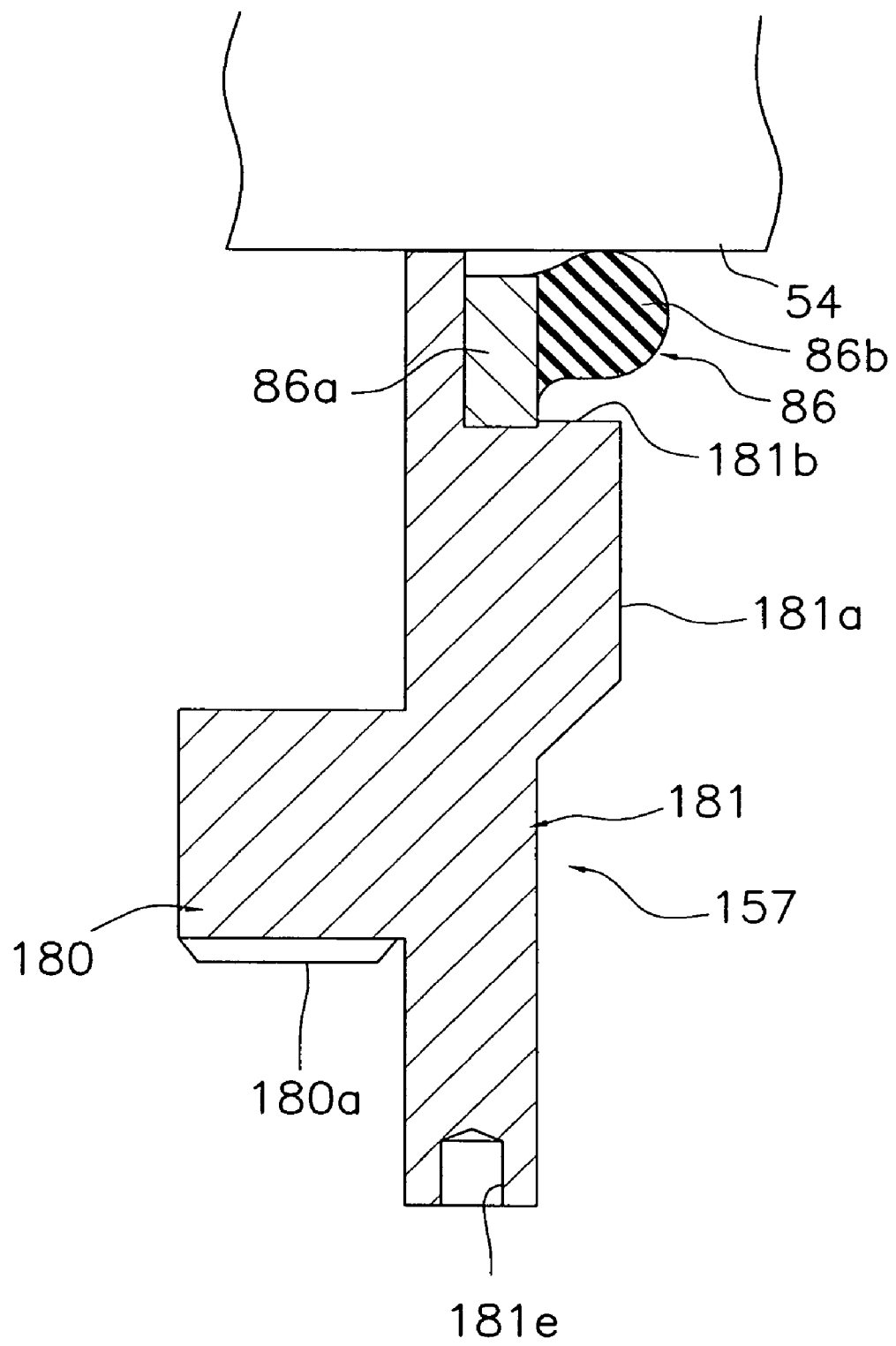
FIG. 7 is an enlarged partial cross sectional view, similar to FIG. 5, of the adjustment member illustrated in FIG. 6.

Referring now to FIGS. 6 and 7, a modified left crank 152 and an adjustment member 157 are illustrated in accordance with a second illustrated embodiment. The left crank 152 and the adjustment member 157 are installed on the crank axle 54 in the same manner as the first illustrated embodiment. In view of the similarity between the first and second illustrated embodiments, the parts of the second illustrated embodiment that are identical to the parts of the first illustrated embodiment will be given the same reference numerals as the parts of the first illustrated embodiment. Moreover, the descriptions of the parts of the second illustrated embodiment that are identical to the parts of the first illustrated embodiment may be omitted for the sake of brevity.

As seen in FIG. 6, for example, the left crank 152 has a hollow left crank body 56 that basically includes a crank axle mounting part 156a, an arm part (same as the first illustrated embodiment) and a pedal mounting part same as the first illustrated embodiment). In this the second illustrated embodiment, the crank axle mounting part 156a includes a concavity 152a on the cover part side, and a female screw part 156d that is formed as a first screw part on the inner circumferential surface of the concavity 152a.

As shown in FIG. 7, the adjustment member 157 has a tube-shaped fixing part 180 and a contact part 181. The tube-shaped fixing part 180 has a male screw part 180a that is formed as a second screw part. The male screw part 180a screws into the female screw part 156d. The contact part 181 is formed at one end of the tube-shaped fixing part 180 and is configured and arranged to contact the bearing 63 supporting the crank axle 54. The contact part 181 has a generally washer shape, with a contact surface 181a being configured and arranged to contact the cover part 65 projects toward the cover member 65 at an intermediate part in the radial direction. Furthermore, a tool anchor hole 181e is provided on the outer circumferential surface to receive a special tool to turn the adjustment member 157.

Locking of the adjustment member 157 in this embodiment is accomplished by a lock nut 158 that screws onto the male screw part 180a, as shown in FIG. 6. That is, when adjustment of bearing play has been completed, the adjustment member 157 is locked by tightening the lock nut 158 toward the wall surface of the crank axle mounting part 156a. Since bearing play is adjusted just by turning the adjustment member 157 when mounting the left crank 152 similar to the previous embodiment, bearing play can be simply adjusted when installing the left crank 152 in this embodiment also.

Although the present invention has been described by way of an example of a left crank mounted on a crank axle integrally fixed to a right crank in the above embodiments, the present invention is also applicable to a right crank (gear crank) connected to a crank axle by a clamping bolt or the like.

Although the adjustment members 57 and 157 of the left cranks 52 and 152 press the bearing 63 through the cover part 65 in the above illustrated embodiments, the adjustment members 57 and 157 can be screwed to the crank assembly so as to directly press against the bearing 63.

Although the bearing housing is screwed into the cover part in the above embodiments, the present invention is also applicable to a crank assembly incorporated in the crank axle assembly having a bearing housing press-fit to a hanger part insofar as bearing play is adjustable by mounting on a crank assembly.

Although the example of a crank axle assembly body is used for a road bike in the above embodiments, the crank axle assembly body of the present invention is applicable to all types of bicycles.

Although the bearing receiving parts are disposed on the outer side in the axial direction of the hanger part in the above embodiments, the bearing receiving part also can be disposed on the inside of the hanger part.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle crank assembly comprising:
   a crank axle having a first axial end and a second axial end;
   a crank body having a crank axle mounting part with a crank axle receiving hole non-rotatably installed on the first axial end of the crank axle, an arm part extending from the crank axle mounting part, a pedal fitting part provided on a radial outer end of the arm part, and a first screw part formed on the crank axle mounting part;
   an adjustment member having a tube-shaped fixing part and a contact part formed as a unit, with the tube-shaped fixing part including a second screw part threadedly engaged with the first screw part to selectively position the contact part formed relative to the crank axle mounting part in an axial direction with respect to a center axis of the crank axle receiving hole, the contact part being fixedly formed on one end of the tube-shaped fixing part and extending radially inward with towards the center axis of the crank axle receiving hole from the tube-shaped fixing part, the contact part being disposed radially inward with respect to the first and second screw parts towards the center axis of the crank axle receiving hole; and
   a bearing disposed on the first axial end of the crank axle adjacent to the adjustment member with the adjustment member being axially disposed between the bearing and the crank axle mounting part with respect to the axial direction.

2. The bicycle crank assembly as set forth in claim 1, wherein
   the first screw part is a male screw part, and the second screw part is a female screw part.

3. The bicycle crank assembly as set forth in claim 2, wherein
   the crank axle receiving hole having a tapered surface that slopes radially inward as the tapered surface extends away from the adjustment member.

4. The bicycle crank assembly as set forth in claim 3, wherein
   the crank axle receiving hole includes a plurality of axially extending recesses formed along at least a portion of the tapered surface to define splines configured to non-rotatably engage the crank axle.

5. The bicycle crank assembly as set forth in claim 2, wherein
   the contact part is configured and arranged to project axially relative to the tube-shaped fixing part to press an inner ring of the bearing inwardly in an axial direction.

6. The bicycle crank assembly as set forth in claim 2, wherein
   the adjustment member has a rotation operation part formed on the outer circumferential surface of the tube-shaped fixing part with the rotation operation part being configured and arranged to assist in rotating the adjustment member.

7. The bicycle crank assembly as set forth in claim 2, wherein
   the adjustment member includes a seal member mounted on an inner circumferential surface of the contact part and arranged to seal a gap between the crank axle and the contact part.

8. The bicycle crank assembly as set forth in claim 1, wherein
   the crank axle receiving hole having a tapered surface that slopes radially inward as the tapered surface extends away from the adjustment member.

9. The bicycle crank assembly as set forth in claim 8, wherein
   the crank axle receiving hole includes a plurality of axially extending recesses formed along at least a portion of the tapered surface to define splines configured to non-rotatably engage the crank axle.

10. The bicycle crank assembly as set forth in claim 1, wherein
    the contact part is configured and arranged to project axially relative to the tube-shaped fixing part to press an inner ring of the bearing inwardly in an axial direction.

11. The bicycle crank assembly as set forth in claim 1, wherein
    the adjustment member has a rotation operation part formed on the outer circumferential surface of the tube-shaped fixing part with the rotation operation part being configured and arranged to assist in rotating the adjustment member.

12. The bicycle crank assembly as set forth in claim 1, wherein
    the adjustment member includes a seal member mounted on an inner circumferential surface of the contact part and arranged to seal a gap between the crank axle and the contact part.

13. The bicycle crank assembly as set forth in claim 1, wherein
the first screw part is a female screw part, and the second screw part is a male screw part.

14. A bicycle crank assembly comprising:
a crank axle having a first axial end and a second axial end;
a crank body having a crank axle mounting part non-rotatably installed on the first axial end of the crank axle, an arm part extending from the crank axle mounting part, a pedal fitting part provided on a radial outer end of the arm part, and a first screw part formed on the crank axle mounting part;
an adjustment member having a tube-shaped fixing part with a second screw part threadedly engaged with the first screw part to selectively position the adjustment member relative to the crank axle mounting part, and a contact part formed on one end of the tube shaped fixing part, the adjustment member having a slit extending completely through both the tube-shaped fixing part and the contact part so that the tube-shaped fixing part and the contact part have an overall configuration of a split ring with a clamping bolt spanning the slit for selectively narrowing the slit; and
a bearing disposed on the first axial end of the crank axle adjacent to the adjustment member with the adjustment member being axially disposed between the bearing and the crank axle mounting part with respect to the axial direction.

15. The bicycle crank assembly as set forth in claim 14, wherein
the tube-shaped fixing part has a pair of projections formed to project from an outer circumferential surface of the tube-shaped fixing part with the clamping bolt being threaded into a screw hole formed in one of the projections and a through-hole being formed in the other one of the projections.

16. The bicycle crank assembly as set forth in claim 14, wherein
the crank axle mounting part has a crank axle receiving hole that is configured to non-rotatably engage the crank axle, the crank axle receiving hole having a tapered surface that slopes radially inward as the tapered surface extends away from the adjustment member.

17. The bicycle crank assembly as set forth in claim 16, wherein
the crank axle receiving hole includes a plurality of axially extending recesses formed along at least a portion of the tapered surface to define splines configured to non-rotatably engage the crank axle.

18. The bicycle crank assembly as set forth in claim 14, wherein
the contact part is configured and arranged to project axially relative to the tube-shaped fixing part to press an inner ring of the bearing inwardly in an axial direction.

19. The bicycle crank assembly as set forth in claim 14, wherein
the adjustment member has a rotation operation part formed on the outer circumferential surface of the tube-shaped fixing part with the rotation operation part being configured and arranged to assist in rotating the adjustment member.

20. The bicycle crank assembly as set forth in claim 14, wherein
the adjustment member includes a seal member mounted on an inner circumferential surface of the contact part and arranged to seal a gap between the crank axle and the contact part.

* * * * *